May 11, 1943.  G. A. BORG  2,318,835
COMPRESSION COUPLING
Filed Oct. 7, 1941  2 Sheets-Sheet 1
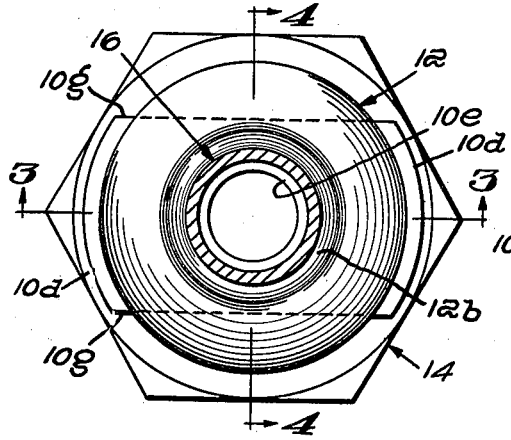
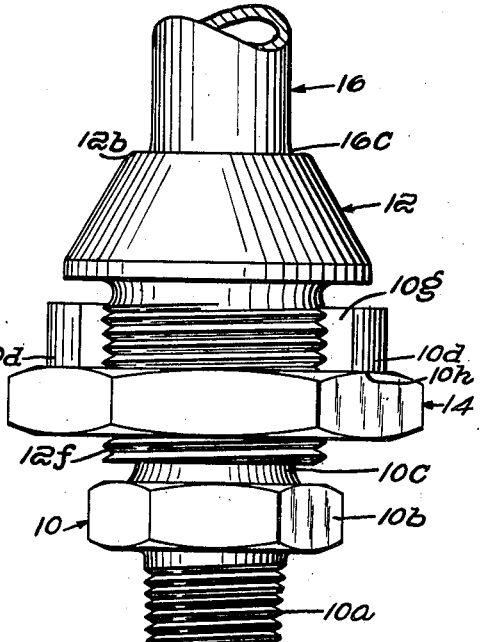
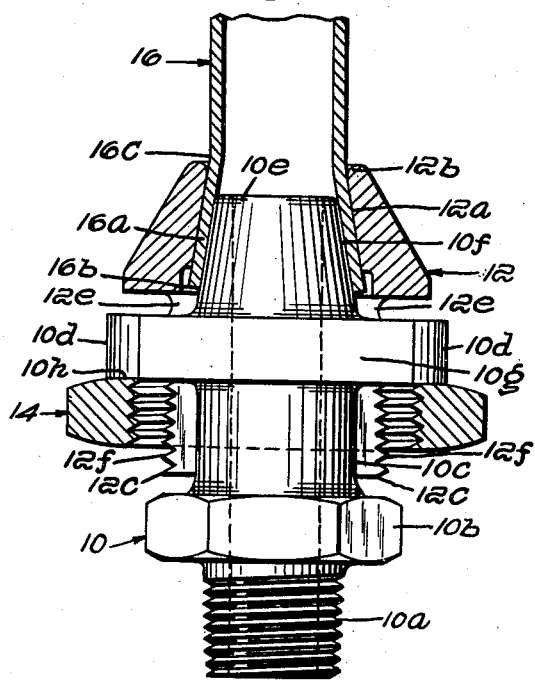
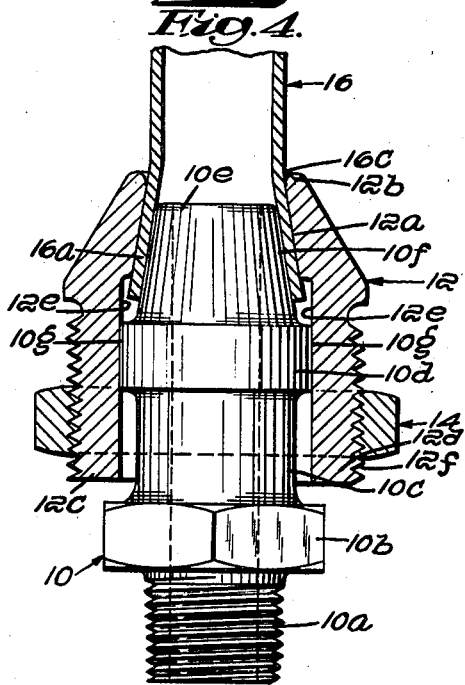
Gustave A. Borg,
Inventor:
By Harry Dexter Peck Attorney

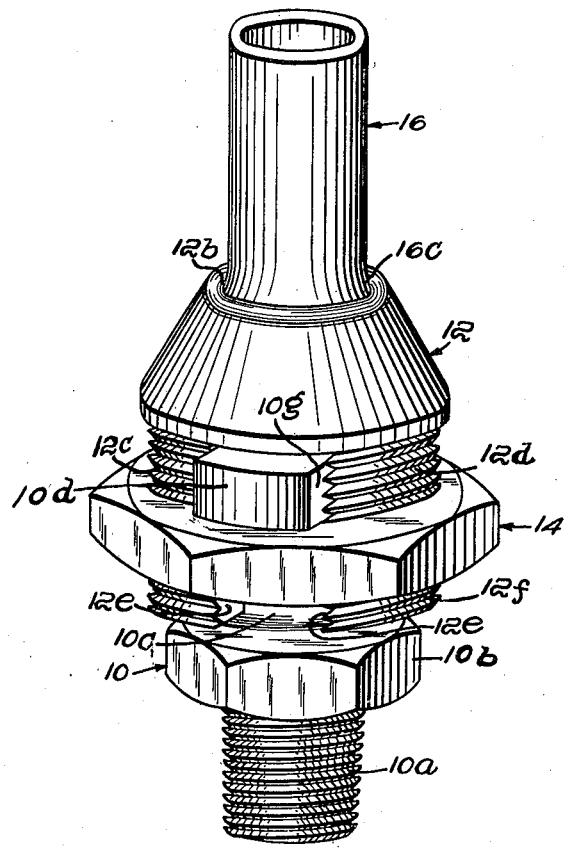

Patented May 11, 1943

2,318,835

UNITED STATES PATENT OFFICE 2,318,835

COMPRESSION COUPLING

Gustave A. Borg, Providence, R. I., assignor to General Fire Extinguisher Company, Providence, R. I., a corporation of Delaware Application October 7, 1941, Serial No. 413,976

2 Claims. (Cl. 285—86)

This invention relates to improvements in compression couplings. More especially it has to do with a coupling whose clamping elements are prevented from rotating while being moved axially to clamp the flared end of a pipe between them.

It is among the objects of my invention to provide a coupling which may be applied to the same pipe a great many times without harm to the pipe, which requires no threads on the pipe and no deformation thereof except a slight flare at the end to be clamped, which applies a strong clamping effect without any rotational or torque action on the pipe, which locks itself against any relative rotational movement between the clamping elements, and which may be easily uncoupled when desired.

The best mode in which I have contemplated applying the principles of my invention is shown in the accompanying drawings but these are to be taken as merely illustrative because it is intended that the patent shall cover by suitable expression in the appended claims whatever features of patentable novelty exist in the invention disclosed.

In the accompanying drawings:

Figure 1 is a plan or axial view of a coupling, embodying my invention, applied to a pipe;

Figure 2 is a side or elevational view of the same;

Figure 3 is a view partly in section, as on line 3—3 of Figure 1;

Figure 4 is another view partly in section, as on line 4—4 of Figure 1; and

Figure 5 is a perspective of the improved coupling.

Referring to the drawings my improved coupling comprises a tubular male member 10, a female member 12, and a nut 14. As herein shown the male member is provided with an externally threaded stem 10a for insertion in a pipe fitting or other interiorly threaded hole, and with wrench-engaging surfaces 10b by which the male member may be securely tightened in such fitting. Beyond the wrench-engaging surfaces the male member has a cylindrical body portion 10c and an arm portion 10d comprising diametrically opposed arms which extend transversely outward from the main cylindrical body portion. Beyond the arm portion the head 10e of the male member tapers toward the axis to form a hollow frustrum of a cone whose conic surface 10f constitutes the inner bearing surfaces of the coupling for the flared end 16a of a pipe or tube 16.

While the angle of taper on the male member is not critical, I prefer to use one of about 10° from the axis, as such an angle gives a considerable area of clamping surface, requires only a slight deformation or flaring of the pipe, and insures a continuous tight joint even when the tube is subjected to severe vibrations. With such a small angle of taper, the wall thickness of the flared end of the pipe is substantially uniform, being only a very little thinner at the edge of the flare than is the normal wall of the pipe.

The female member 12 has an inner clamping surface 12a which may have the same angle of flare as that of the clamping surface 10f of the male member, or for more precise fitting the angle of flare of the inner clamping surface 12a may be of the order of 9° from the axis to accommodate the gradual thinning of the wall in the flare of the pipe.

Preferably, as shown in Figs. 3 and 4, the clamping surfaces of the male and female members are so disposed that when the flared end of the pipe is between them, the clamping surface 10f of the male member extends beyond the edge 16b of the pipe flare, whereas the adjacent end of the clamping surface 12a of the female member falls somewhat short of this edge. At the small end 16c of the pipe flare, at the junction of the flare and the normal pipe wall, the end of clamping surface 10f of the male member does not extend to the junction whereas the clamping surface 12a of the female member does extend very close to the junction and there terminates in an outwardly rounded edge or surface 12b.

The female member has an externally threaded skirt formed in two parts 12c and 12d to provide a diametrically disposed slot within which the arm portion 10d of the male member is positioned. The skirt parts extend downward past the arm portion and each part has a flat surface 12e adapted to contact a corresponding flat surface 10g of the arm portion. Accordingly, when the male member is inserted axially within the female member, the interengagement of the arm portion and the skirt parts prevent any relative rotation between the male and female members while permitting relative axial or longitudinal movement to occur.

The nut 14 screws onto the external threads 12f of the skirt parts and comes to bear against the under surface 10h of the arm portion. When this occurs further rotation of the nut draws the clamping surfaces 12a and 10f of the female and male members axially toward one another and thus effects a tight clamping between them of the flared end of the pipe. As the nut is tightened, there may occur a slight swedging action on the wall of the pipe flare, especially if the angle of flare of both clamping surfaces is the same. This swedging action results in the material of the pipe being forced into intimate surface contact with the clamping surfaces of the male and female members with consequent extreme tightest of fit between all surfaces under compression.

It is to be noted however that the clamping action, and such swedging action as may occur, does not involve any relative rotation between either clamping surface and the pipe. The latter is in no wise twisted or weakened and consequently my improved coupling may be applied repeatedly to the same pipe without the latter or the clamping surfaces becoming harmed or disturbed. Because the male and female members are locked against any relative rotation the coupling may safely be used where a pipe is subjected to severe vibrations, because the latter can not exert any rotative action on the nut 14 tending to loosen it.

If it is desired to unite one pipe to another, two couplings as shown in the drawings may be joined together by a union (not shown) screwed onto the respective stems 10a of the male members and then one pipe may be clamped to one coupling and the other pipe clamped to the other coupling in the manner hereinbefore described. This arrangement enables broken pipes or tubes to be easily and quickly repaired in the field by simply cutting out the broken portion and joining the new ends thus formed with a pair of my improved couplings and a union. The new pipe ends need be only slightly flared to accommodate the gradual taper of the clamping surfaces of the coupling.

As is evident from the disclosure, a tight, self-locking joint may be effected without the threading of any pipe and without any rotational movement between the pipe and the clamping surfaces. The only rotational movement involved is the customary one of a nut on external threads. Accordingly the coupling may be repeatedly applied without harm to itself or the pipe.

I claim:

1. A compression coupling comprising a male member having a clamping surface adapted to engage the inner surface of the flared end of a pipe and having a transversely disposed arm portion, a female member having a clamping surface adapted to engage the outer surface of the flared end of the pipe and having a transversely disposed slot to receive said arm portion to thereby prevent relative rotation between said members, and a nut adapted to be screwed along said female member to engage said arm portion for effecting relative axial movement of said members to clamp said flared pipe end between said clamping surfaces.

2. A compression coupling comprising a male member having a clamping surface arranged to engage the inner surface of the flared end of a pipe and having a transversely disposed arm portion, a female member having a clamping surface arranged to engage the outer surface of said flared end and having a transversely disposed slot to receive said arm portion whereby relative rotation between said members is prevented; there being externally threaded portions of said female member extending beyond said arm portion in a direction away from said clamping surfaces; and a nut adapted to be screwed onto said threaded portions for engagement with the arm portion to effect relative longitudinal movement between said members and thereby clamp the said flared pipe end between said clamping surfaces.

GUSTAVE A. BORG.